Patented Oct. 27, 1936

2,058,844

UNITED STATES PATENT OFFICE

2,058,844

HYDROLYSIS OF THE ORGANIC ESTERS OF INORGANIC ACIDS

Thomas H. Vaughn, Niagara Falls, N. Y., assignor to Carbide and Carbon Chemicals Corporation, a corporation of New York No Drawing. Application February 19, 1936, Serial No. 64,651

24 Claims. (Cl. 106—9)

This invention relates to the hydrolysis of esters of inorganic acids, and the resultant preparation of a product adapted for use in coating, impregnating, or bonding a wide variety of materials, such as textiles, fibrous materials in general, and plastic masses, including refractory aggregates; and to shaped articles containing such product. The invention has especial utility in the preparation of molds and other articles fabricated of refractory materials, and particularly those designed to withstand high temperatures without injury, such as are described in the pending patent application, Serial No. 707,543 of A. B. Ray, filed January 20, 1934, relating to "Mold and method for its production", said application matured into Patent No. 2,027,932, issued January 14, 1936.

The said product comprises a colloidal solution or emulsion of a normally water-insoluble ester of an inorganic acid, in water or other aqueous liquid in which the said ester is insoluble. The said ester preferably is in an at least partially hydrolyzed state.

Among the more important objects of the invention are: To provide in novel manner for the regulated hydrolysis of water-insoluble esters of inorganic acids,—such as the alkylsilicates and borates, and similar esters of the acids of titanium and zirconium—; to prepare stable solutions of such esters with an agent adapted upon the addition of water to provide stable emulsions; and to provide in novel manner for producing refractory articles having surfaces that are relatively smooth, hard and strong.

Practically all of the industrial applications of the alkylsilicates and other water-insoluble esters of like inorganic acids depend upon the partial or complete hydrolysis of the ester either prior to or during their use. Since these esters are insoluble in water, it is not possible properly to control the hydrolysis thereof merely by mixing water with the ester.

Processes used for the hydrolysis of such esters prior to the present invention have consisted in bringing the water and the ester together in a suitable mutual solvent, such as the water-soluble alcohols, ketones, etc. An example of such process is disclosed in the U. S. Patent 1,809,755 to King and Threlfall. Such a process—because of the quantities of alcohols required and which are dissipated during the process—is relatively expensive. Moreover, the hydrolyzed solution often is rather difficult to prepare at the site of its use; and the prepared solution frequently is not stable, and hence cannot be stored for any great length of time, as in many instances is desirable.

It has now been found that these esters readily can be hydrolyzed to any selected degree by bringing the water or aqueous liquid and the ester together to form an emulsion, in the presence of a compound adapted to function as an emulsifying agent for emulsions of the oil-in-water type; that emulsions thus formed are stable and are capable of setting to form homogeneous gels or solids; and that mixtures of these emulsions with refractory aggregates such as finely-divided alundum, silica, and similar oxides, etc. yield articles which upon drying and/or firing are exceedingly strong and free from cracks and bubbles. There is no apparent shrinkage of these masses during such drying and/or firing operations.

According to the present invention, the ester is emulsified with water by means of an emulsifying agent which preferably is either neutral or slightly alkaline in reaction, and which itself may be capable of hydrolysis under the conditions of use. The agent may be either soluble or insoluble in the ester, but must be at least partially soluble in water. If desired, an excess of water over that required for complete hydrolysis of the ester may be used.

Among the emulsifying agents preferred for use with the invention are water-soluble soaps, such as the alkali metal, ammonium, amine, and substituted amine salts of the soap-forming fatty acids, and various water-soluble alkyl-sulfonates and sulfates produced from olefines and olefine derivatives and having more than eight carbon atoms in the molecule. Those compounds found especially suitable for the purpose include the mono-, di-, and tri ethanol, amyl, and butyl amine oleates, stearates, and palmitates; the water-soluble alkali metal and amine salts of the alkyl-sulfates of the higher fatty alcohols, such as the "Gardinols"; and the alkali metal and amine salts of the alkylsulfates of the higher secondary alcohols, such as the "Texitols".

The components from which the emulsion is to be formed may be brought together in various ways, as is indicated in the examples hereinafter recited. Atmospheric pressure and temperature may be employed. The emulsifying agent may be formed from the base and the corresponding fatty acid, alkyl acid sulfate or alkylsulfonate,— in the presence of the ester to be emulsified and water. Generally, the fatty acid or its equivalent and the base are used in approximately the ratio of their equivalent weights. An excess of the base tends to shorten the time required for the setting of the emulsion, as indicated in Examples 5 and 6 appearing hereinafter.

The following examples will serve to illustrate the invention:

Example 1

35 grams of tetraethyl silicate was added to 16 grams of oleic acid, and 2.1 grams of triethanolamine was added to this mixture. 30 grams of water was added slowly with vigorous stirring. 75 grams of the said ester was then added with stirring, followed by 60 grams of water. The resultant product was a thin creamy material that set to a solid mass in five days. During this time alcohol produced from the alkyl groups of the ester permeated the solid material.

Example 2

A solution of 8 grams of oleic acid in 100 grams of condensed ethyl silicate was added to a solution of 3.2 grams of triethanolamine in 100 grams of water. Upon mixing, a thin creamy emulsion was obtained which set to a solid in two days.

Example 3

35 grams of condensed ethyl silicate was added to 14 grams of oleic acid, and 4.3 grams of monoamyl amine was added to this mixture. 30 grams of water was then added with agitation. Additional amounts of 75 grams of the ester and 60 grams of water then were added as in Example 1. A thin creamy emulsion was obtained which set to a solid in ten minutes.

Example 4

7.9 grams of diamyl amine was added to 120 grams of condensed ethyl silicate and 14 grams of oleic acid was added to this mixture. 25 grams of water was stirred into this solution of soap in water. The resultant creamy emulsion set to a solid in thirty minutes.

Example 5

4.5 grams of a 66% solution of ethylene diamine in water was added to 90 grams of water. This mixture was stirred into a solution of 14 grams of oleic acid in 110 grams of condensed ethyl silicate. The resultant creamy emulsion set to a solid in eighty minutes.

Example 6

Following the procedure of Example 5, but increasing the amount of ethylene diamine to 9 grams, the resultant creamy emulsion set to a solid in two minutes.

The foregoing examples illustrate the fact that by the use of different emulsifying agents and by variations in the amounts of these materials, emulsified products of widely varying setting times may be produced. This control of setting time has many important industrial advantages.

Example 7

A solution of 3.2 grams of triethanolamine in 100 grams of water was heated to 70° C. and stirred into a similarly heated solution of 7 grams of palmitic acid in 100 cc. of condensed ethyl silicate. The resultant emulsion set to a soft gel in 2.5 hours which became firm after an additional hour.

Example 8

100 cc. of cold water was stirred into a solution of 10.2 grams of triethanolamine palmitate in 100 cc. of condensed ethyl silicate. A good emulsion was obtained which set to a firm gel in one hour and twenty minutes.

Example 9

100 cc. of condensed ethyl silicate was stirred into a solution of 10 grams of Ivory soap granules and 100 cc. of water, the latter solution being at 60° C. The resultant emulsion was still liquid after four hours, and had set to a stiff jelly in twenty-eight hours.

Example 10

A solution of 4 grams of diamyl amine and 7 grams of stearic acid in 100 cc. of condensed ethyl silicate was heated to 80° C. 100 cc. of water then was stirred slowly into the mixture. The resultant emulsion had set to a stiff jelly in twenty minutes, and was very firm after twenty-five minutes. Diamyl amine stearate is very soluble in the said ester in the cold.

Example 11

50 cc. of condensed ethyl silicate was added with agitation to a mixture of 10 grams of a 25% solution of the sodium salt of a sulfate ester derived from secondary heptadecyl alcohol, and 100 grams of water. An additional 100 grams of the said silicate then was added to the resultant emulsion. The final emulsion had set to a stiff jelly after eight days.

By using a soap insoluble in the silicic acid ester and by using only a moderate quantity of water it is possible to obtain, instead of the thin creamy emulsions, a material containing both a gel and a liquid phase. After the latter phase is removed by filtration or other mechanical treatment and allowed to stand, it solidifies to a clear, transparent, glass-like material possessing considerable strength. Such a product may be prepared in accordance with the following example:

Example 12

120 grams of condensed ethyl silicate was added to 20 grams of oleic acid. This was poured into a solution of 8 grams of triethanolamine in 25 grams of water. Upon gentle agitation, a jelly formed which separated from the bulk of the liquid. The mixture was filtered, and the clear filtrate was allowed to stand at room temperature for twenty-four hours, yielding a clear, hard, transparent, amber-like material.

Water-free solutions of amine soaps such as the oleates in silicic acid esters are stable and may be kept indefinitely. Such solutions have been kept for seven and a half months without showing signs of change. This property makes it possible to prepare such solutions and subsequently to treat them with water when it is desired to effect hydrolysis of the ester. Thus:

Example 13

A solution of diamyl amine oleate in condensed ethyl silicate, prepared by adding 14 grams of oleic acid and 7 grams of diamyl amine to 110 grams of the ethyl silicate was allowed to stand for several weeks. The unchanged material was then treated with water and was found to hydrolyze very readily. The amount of water required is not limited to the theoretical amount necessary for the hydrolysis of the ester. If desired, an excess may be used as a diluent.

Since solutions of oleic acid in silicic acid esters also are stable, it is possible to prepare in advance of the time of their use such solutions and also solutions of the desired base in water. Subsequently, when it is desired to effect hydrolysis of the ester, it is necessary merely to mix these solutions in suitable proportions. This is of particular importance in connection with certain uses of the esters as, for example, in the making of ceramic mixes. It is possible to wet the ceramic materials with a solution of an organic amine in water and to add to this mixture the selected silicic acid ester and fatty acid. Emulsification immediately occurs; and the ester penetrates the entire mass.

The following examples illustrate a modification of the invention in which emulsified silicic acid esters are used as bonding agents for ceramic mixtures:

Example 14

Two stock solutions were made up as follows:

A. 500 cc. of condensed ethyl silicate and 70 grams of oleic acid.

B. 500 cc. of water containing 25 grams of ethylene diamine.

80 cc. of solution A was mixed with 100 cc. of solution B and 375 grams of "Alundum" flour. A mold made from the resultant mass was allowed to stand for several hours, dried overnight at 120° C., and then fired at 900° C. The resultant mold had good strength, was free from cracks, and substantially free from bubbles.

Example 15

Following the practice outlined in Example 14, but employing 90 cc. of solution A, 90 cc. of solution B, 375 grams of "Alundum" flour, and MgO in amount .25% of the "Alundum", the same character of mold described in Example 14 was produced.

Example 16

25 grams of "Alundum" flour was mixed with 7 grams of an emulsion of triamylamine oleate in condensed ethyl silicate, yielding a product of suitable consistency which, after drying at 110° C. for about three hours, gave a ceramic product of good strength and appearance. The said emulsion was prepared by mixing 110 grams of condensed ethyl silicate, 14 grams of oleic acid, and 11.4 grams of triamylamine, and 90 grams of water. About one-third of the ester was added to the total amount of oleic acid, and the triamylamine was then added to this mixture. A volume of water equal to the ester in the mixture was then slowly added with vigorous stirring. The remainder of the ester was then added, and finally the balance of the water. The emulsion thus produced had a setting time of six hours.

Example 17

A solution of diamyl amine oleate in tributyl borate was prepared from 7 grams of oleic acid, 3.9 grams of diamyl amine, and 50 grams of butyl borate. 50 grams of water was added to the solution. The emulsion thus obtained warmed up and deposited boric acid within a few minutes. This illustrates the application of this method of hydrolysis to boric acid esters.

The setting time of the emulsions in water may be modified by the addition of certain materials. For example, "Cellosolves" glycols, and certain alcohols, such as tetrahydrofurfuryl alcohol increased the time required for setting; while basic compounds, such as amines and MgO accelerate the rate of hydrolysis of the ester.

The invention is particularly efficacious for the hydrolysis of the esters of ortho-silicic acid, such as the monohydric alcohol silicates, i. e. tetramethyl silicate, tetraethyl silicate and tetrabutyl silicate; the condensed monohydric alcohol silicates such as methyl disilicate, methyl trisilicate and ethyl disilicate; the polyhydric alcohol silicates, such as tertiary glycerol silicate and secondary glycol silicate; and the condensed polyhydric alcohol silicates, all of which are relatively insoluble in water.

The term "ester of an inorganic acid capable upon hydrolysis and subsequent ignition of yielding a refractory oxide", and similar terms appearing in the specification and claims, are intended to designate generally alkyl silicates and similar esters of the acids of titanium, zirconium, and boron. The term "silicic acid ester" as herein employed is intended to include any alkyl silicate or condensed alkyl silicate derived from either a monohydric or polyhydric alcohol, or mixtures of alkyl silicates.

The invention is susceptible of modification within the scope of the appended claims.

I claim:

1. A process for preparing a colloidal solution of an ester of an inorganic acid capable upon hydrolysis and subsequent ignition of yielding a refractory oxide, which comprises hydrolyzing the said ester in the presence of a water-soluble emulsifying agent.

2. A process for preparing a colloidal solution of an ester of an inorganic acid capable upon hydrolysis and subsequent ignition of yielding a refractory oxide, which comprises hydrolyzing the said ester in the presence of a water-soluble soap.

3. A process for preparing a colloidal solution of an ester of an inorganic acid capable upon hydrolysis and subsequent ignition of yielding a refractory oxide, which comprises hydrolyzing the said ester in the presence of an amine salt of a fatty acid.

4. A process for preparing a colloidal solution of an ester of an inorganic acid capable upon hydrolysis and subsequent ignition of yielding a refractory oxide, which comprises hydrolyzing the said ester in the presence of a water-soluble amine salt of a fatty acid.

5. A process for preparing a colloidal solution of silica which comprises hydrolyzing a silicic acid ester in the presence of an emulsifying agent which is at least partially soluble in water.

6. A process for preparing a colloidal solution of silica which comprises hydrolyzing a silicic acid ester in the presence of an alkaline medium containing an emulsifying agent which is at least partially soluble in water.

7. A process for preparing a colloidal solution of silica which comprises hydrolyzing a silicic acid ester in the presence of a water-soluble soap.

8. The process of hydroyzing a water-insoluble ester of an inorganic acid while in the form of an emulsion, which comprises reacting together the said ester and water in the presence of a water-soluble emulsifying agent.

9. Process for preparing a stable solution of a water-insoluble ester of an inorganic acid adapted upon hydrolysis and subsequent ignition to form a refractory oxide, which comprises adding to the said ester a small amount of a water-soluble emulsifying agent.

10. Process for preparing a stable solution of a water-insoluble ester of an inorganic acid adapted upon hydrolysis and subsequent ignition to form a refractory oxide, which comprises adding to the said ester a small amount of a water-soluble soap substantially in the absence of water.

11. Process for preparing a stable solution of a water-insoluble ester of an inorganic acid adapted upon hydrolysis and subsequent ignition to form a refractory oxide, which comprises adding to the said ester a small amount of a soap-making fatty acid substantially in the absence of water.

12. Process for preparing a stable solution of a water-insoluble ester of an inorganic acid adapted upon hydrolysis and subsequent ignition to form a refractory oxide, which comprises adding to the said ester a small amount of a water-soluble emulsifying agent substantially in the absence of water.

13. The process for producing a settable refractory mass, which comprises at least partially hydrolyzing in the presence of a water-soluble emulsifying agent a water-insoluble ester of an inorganic acid adapted upon hydrolysis and subsequent ignition to form a refractory oxide, and admixing the resultant material with finely-divided refractory material to form a settable refractory mass.

14. The process for producing a settable refractory mass, which comprises at least partially hydrolyzing in the presence of a water-soluble soap a water-insoluble ester of an inorganic acid adapted upon hydrolysis and subsequent ignition to form a refractory oxide, and admixing the resultant material with finely-divided refractory material to form a settable refractory mass.

15. Process for producing a settable refractory mass, which comprises at least partially hydrolyzing a water-insoluble silicic acid ester in the presence of a water-soluble emulsifying agent, and admixing the resultant material with finely-divided refractory material to form the settable refractory paste.

16. Process for producing a shaped refractory article, which comprises at least partially hydrolyzing a water-insoluble silicic acid ester in the presence of a water-soluble soap, admixing the resultant material as a binder with finely-divided refractory material to form a settable refractory mass, shaping the article from the said mass, and drying and firing the shaped article.

17. Process for producing a settable refractory mass, which comprises mixing together a solution of a fatty acid in a silicic acid ester, an aqueous solution of a water-soluble base, and a finely-divided refractory material.

18. In the process for producing a settable refractory mass, the steps which comprise intimately mixing a solution of a fatty acid in a silicic acid ester, and a mixture of a finely-divided refractory material in an aqueous solution of a water-soluble base.

19. In the process for producing a settable refractory mass, the steps which comprise intimately mixing an aqueous solution of a water-soluble base and a mixture of finely-divided refractory material in a solution of a fatty acid in a silicic acid ester.

20. Process for producing a settable refractory mass, which comprises at least partially hydrolyzing in the presence of a water-soluble emulsifying agent a water-insoluble ester of an inorganic acid adapted upon hydrolysis and subsequent ignition to yield a refractory oxide, and admixing the resultant material with finely-divided refractory material in the presence of an accelerant for the setting of the resultant mass, thereby forming a settable refractory mass.

21. Process for producing a settable refractory mass, which comprises at least partially hydrolyzing in the presence of a water-soluble emulsifying agent a water-insoluble silicic acid ester, and admixing the resultant material with finely-divided refractory material in the presence of an inorganic base serving to accelerate the setting of the resultant settable refractory mass.

22. Process for producing a settable refractory mass, which comprises at least partially hydrolyzing in the presence of a water-soluble emulsifying agent a water-insoluble ester of an inorganic acid adapted upon hydrolysis and subsequent ignition to yield a refractory oxide, and admixing the resultant material with finely-divided refractory material in the presence of magnesium oxide, thereby forming a settable refractory mass.

23. The process for preparing a colloidal solution of an ester of an inorganic acid capable upon hydrolysis and subsequent ignition of yielding a refractory oxide, which comprises hydrolyzing the said ester in the presence of a water-soluble organic compound containing more than 8 carbon atoms in the molecule, and selected from the group consisting of the water-soluble alkyl sulfonates and alkyl sulfates.

24. The process for preparing a colloidal solution of an ester of an inorganic acid capable upon hydrolysis and subsequent ignition of yielding a refractory oxide, which comprises hydrolyzing the said ester in the presence of a water-soluble alkyl sulfate of a higher alcohol.

THOMAS H. VAUGHN.